May 16, 1950 B. H. KENNEDY 2,508,032
STRUCTURAL METAL MEMBER
Filed Dec. 22, 1945 2 Sheets-Sheet 1
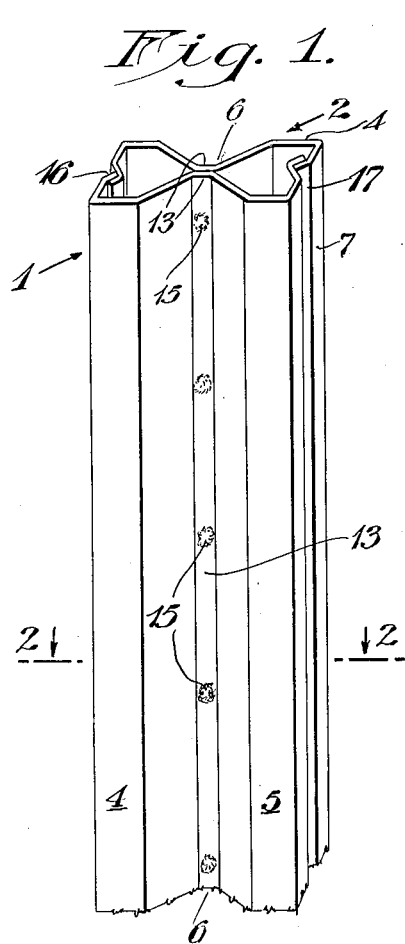
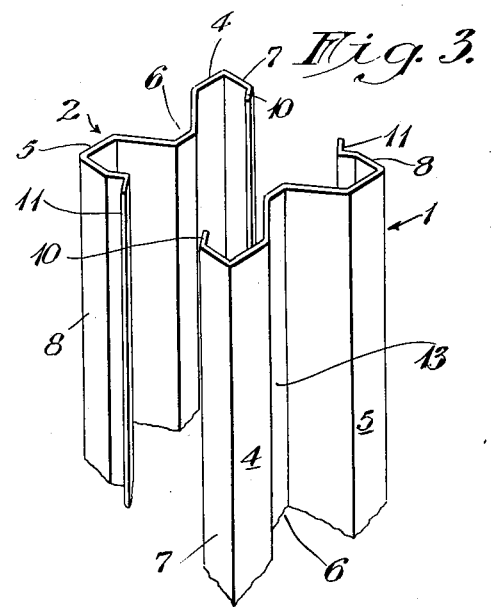
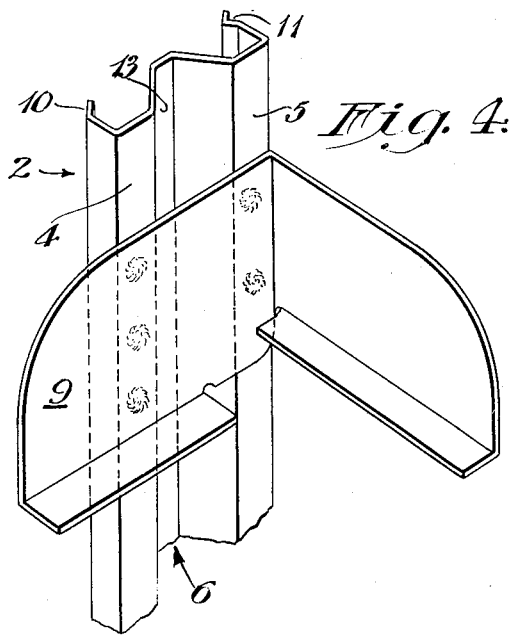
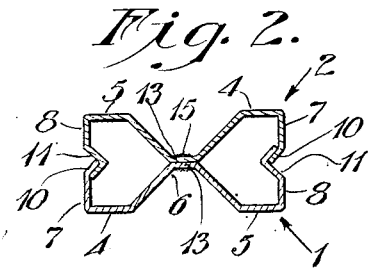
INVENTOR
*BENJAMIN H. KENNEDY*
BY
*Pennie, Davis, Marvin & Edmonds*
ATTORNEYS May 16, 1950  B. H. KENNEDY  2,508,032
STRUCTURAL METAL MEMBER
Filed Dec. 22, 1945  2 Sheets-Sheet 2
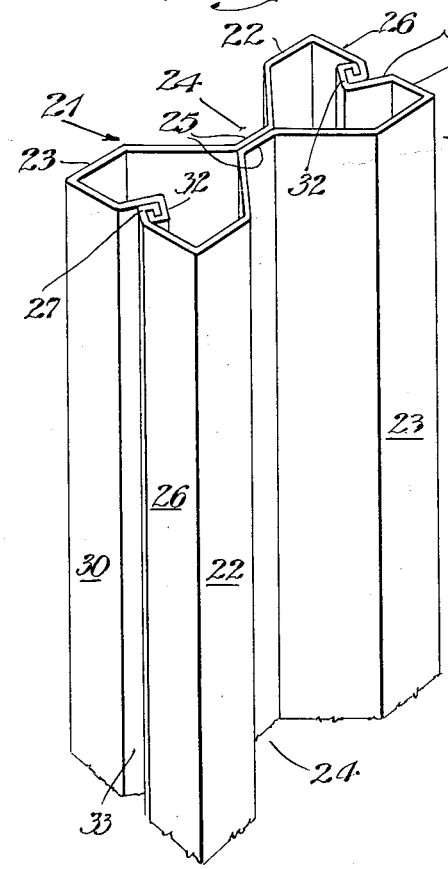
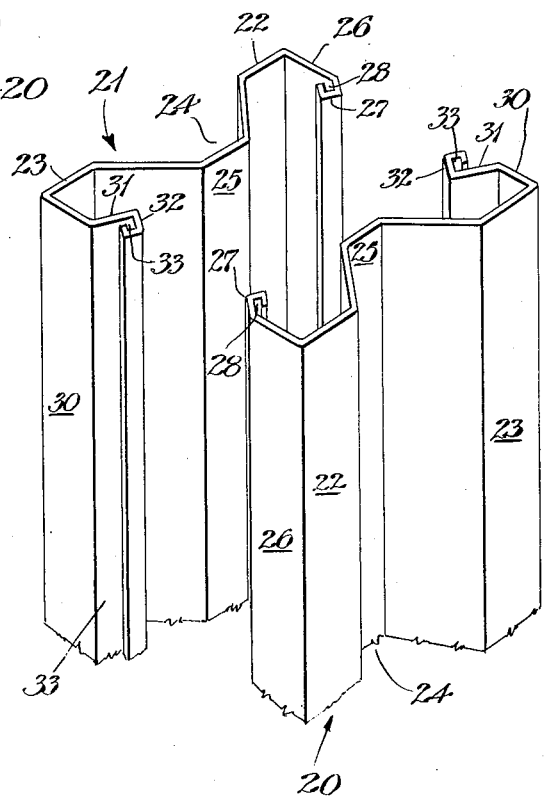
INVENTOR
*BENJAMIN H. KENNEDY*
BY
*Pennie, Davis, Marvin & Edmonds*
ATTORNEYS Patented May 16, 1950

2,508,032

UNITED STATES PATENT OFFICE 2,508,032

STRUCTURAL METAL MEMBER

Benjamin H. Kennedy, Pittsford, N. Y.

Application December 22, 1945, Serial No. 636,777

4 Claims. (Cl. 189—37)

This invention relates to structural members, such as bars or beams, and has for its object the provision of an improved article of this character. In one of its forms, the invention provides two pieces of angularly bent sheet or plate metal that are interconnected to form a beam of light weight, great strength, and decorative appearance. In one of its embodiments, the invention provides a beam which is enclosed, as viewed in lateral cross-section, advantageously of rectangular configuration, with several angular bends, flat panel sections and grooves or channels.

The beam of the invention is especially important where light weight, strength, rigidity and good appearance are requirements. One feature of the invention is that but a single piece of the angularly shaped metal need be used as a beam member for both parts of the beam. By reversing the two like members end-for-end with respect to each other, they may be connected to form a beam of the invention. I so roll, press or fold a sheet of metal that two pieces of the formed sheet may be connected together to form a beam which is rectangular in its general cross-sectional shape with all four sides finished, for example, with flat sections and grooves or channels which add to its strength and good appearance. The connecting edges are preferably so arranged as to be concealed. The beam has ample flat surfaces for the welding or otherwise attaching thereto of plates, brackets and other members requiring welding, especially spot welding. One important feature of the invention is that I may spot weld various pieces of metal to one of the formed beam members and then connect two of the members together to form a beam which is completely enclosed on its four sides with one or more pieces of metal spot welded thereto.

In one form of the invention, the beam members are merely placed one over the other in asymmetric positions and connected, as by spot welding, along their contacting centers, the edges cooperatively engaging each other in side grooves. In another form, the two beam members, reversed to be in asymmetric positions, are telescopically connected by means of edge folds or hooks which lock the members together, concealing the edges and providing a decorative feature.

These and other novel features of the invention will be better understood after considering the following discussion taken in conjunction with the accompanying drawings, in which:

Fig. 1 is a perspective view of a beam of the invention;

Fig. 2 is a view along the line 2—2 of Fig. 1;

Fig. 3 is a perspective view showing two beam members of Fig. 1 in exploded position;

Fig. 4 illustrates a manner of attaching another member to one of the beam members by spot welding;

Fig. 5 is a perspective view of another form of beam of the invention, and

Fig. 6 is a perspective view of two of the beam members of Fig. 5 in exploded position.

The beam illustrated in Figs. 1 to 3 comprises two beam members 1 and 2 formed of sheet metal, such as rolled steel. The two beam members are identical in construction and in their assembly one of the members is reversed end-for-end.

Each beam member comprises a central longitudinal panel, which forms one side of the beam, with two flat portions 4 and 5 between which is an angular groove or channel 6, and two flat side panels or sections 7 and 8 bent at right angles to the sections 4 and 5. The edge portion of the side 7 merely has an angular bend 10 while the side portion 8 has a double angular bend 11 in the form of a V. It will be seen that each beam member has several angular bends and is accordingly very greatly stiffened. Moreover, the spaced flat surfaces 4 and 5 provide excellent bearing surfaces for the attachment thereto of flat metal members 9 or the like by spot welding, as shown in Fig. 4. The beam member may be spot welded to other pieces of metal, since the various flat surfaces are accessible to spot welding electrodes before the two members are connected together to form the beam.

In assembling the beam, one of the beam members is turned end-for-end giving the asymmetric relationship shown in Fig. 3 and then they are brought together to the positions shown in Fig. 1. The central flat sections 13 in the bottoms of the grooves 6 are in bearing contact and may be securely attached in any suitable way, such as by bolts, or preferably by spot welds 15. The single angular bend 10 of one member fits into close engagement with the double or V bend 11 of the opposite member. This construction not only conceals the edges but supports them one against the other and also provides decorative longitudinal grooves 16 and 17 on each side in addition to the structural reinforcement provided by the several bends.

The form of beam illustrated in Fig. 5 comprises two beam members 20 and 21, each having a central panel which forms a side of the beam comprising two flat sections 22 and 23 between which is formed the groove or channel 24, the bottom of which has a flat section 25 formed by angularly bending the sheet metal. Each member comprises a side panel or section 26 bent at right angles to the side section 22. The metal contiguous with the metal of section 22 has an off-set inward bend 27 and the edge portion is bent to form the hook or slot 28.

Each flat section 23 has a side panel or section 30 formed at right angles thereto by bending the sheet. The metal contiguous with the side section 30 is bent inwardly at 31, then outwardly at 32 to form a V-shaped channel and the edge portion is bent to form a hook or slot 33. The edge portion with its slot 33 is similar in size and shape to the slot 28, both of which may be formed of round or angular bends and the space of the slots are preferably the approximate width of the thickness of the sheet.

In assembling the two beam members 20 and 21 together to form the beam of Fig. 5, one of the members is turned end-for-end to provide the relative positions shown in Fig. 6, then moved to end-to-end contact, and the hooks 28 and 33 are inserted one inside of the other and the beams slid together lengthwise. This construction locks the two beam members together throughout their lengths and gives a very rigid structure. It will be noted that the central and flat sections 25 at the bottoms of the grooves 24 are in bearing contact with each other and this contributes to the strength of the beam. The two sections may be held together to prevent lengthwise slipping by means of spot welding or crimping the extreme edges of the hooks. Spaced spot welds of the sections 25 may also be used.

The beam members may be formed in any suitable metal working operation, such as by means of the usual sheet or plate metal bending apparatus, or by means of rollers or dies. When using thin sheet material, the beam members may be formed in a simple operation by means of forming dies.

I claim:

1. A structural beam which comprises two identical interconnected members forming the beam, each member having a central panel with two flat sections and a groove formed therebetween, two flat side panels bent at right angles to the flat sections, each side panel having an edge portion bent inwardly at an acute angle and another edge portion also bent inwardly at an acute angle and then outwardly in the form of a V, said members being turned end for end and placed together with the inwardly bent edge in nested contact with the edge bent to a V, thereby concealing the edges and also providing a V-shaped groove in two opposite sides of the beam, and means for securing the two members together.

2. A sheet metal member for forming a beam which comprises a central panel having one longitudinal groove and two flat sections one on each side of the groove, two side panels at right angles to the flat sections, each side panel having an edge portion bent inwardly at an acute angle and one edge further bent to form a V to provide an interconnecting joint with the opposite edge portion of a like member turned end-for-end and form a V-shaped longitudinal groove on two opposite sides in the beam.

3. A structural beam which comprises two interconnected identical members, each member having a central panel with two flat sections and a groove formed therebetween, two side panels bent at right angles to the flat sections, each side panel having an edge portion bent inwardly at an acute angle and then bent three times to form a hook to engage a complemental hook of the other member and secure the two members together, said members being in reverse end-for-end relation with the hooks in slidable connection.

4. A sheet metal member for forming a beam which comprises a central panel having one longitudinal groove and two flat sections one at each side of the groove, two side panels at right angles to the flat sections, each side panel having an edge portion bent inwardly at an acute angle, one of said edge portions being outwardly bent to provide a hook and the other edge portion being inwardly bent to provide a complemental shaped hook, whereby a member in reverse end-for-end relation to a like member can be connected thereto by sliding the hooks over each other forming two interlocking joints.

BENJAMIN H. KENNEDY.

REFERENCES CITED

The following references are of record in the file of this patent:

UNITED STATES PATENTS

| Number | Name | Date |
| --- | --- | --- |
| 426,559 | Dithridge | Apr. 29, 1890 |
| 594,766 | Taylor | Nov. 30, 1897 |
| 693,494 | Carnahan | Feb. 19, 1902 |
| 1,090,171 | Schisler | Mar. 17, 1914 |
| 1,997,876 | Sheldon | Apr. 16, 1935 |
| 2,049,926 | Rafter | Aug. 4, 1936 |
| 2,098,676 | Rafter | Nov. 9, 1937 |